United States Patent [19]

Kolb

[11] 4,039,781

[45] Aug. 2, 1977

[54] CIRCUIT ARRANGEMENT FOR PROTECTIVE COUPLINGS

[75] Inventor: Dieter Kolb, Stuttgart, Germany

[73] Assignee: Werner & Pfleiderer, Stuttgart, Germany

[21] Appl. No.: 685,143

[22] Filed: May 11, 1976

[30] Foreign Application Priority Data

May 31, 1975  Germany .............................. 2524178

[51] Int. Cl.² ........................ G06M 3/08; G06M 3/02
[52] U.S. Cl. ........................... 235/92 EV; 235/92 PE; 235/92 R; 235/103.5 R
[58] Field of Search ........ 235/92 EV, 92 PB, 92 MP, 235/92 PE, 92 GE, 92 PD, 103.5 R, 103.5 E; 340/268, 271

[56] References Cited

U.S. PATENT DOCUMENTS

| 2,959,772 | 11/1960 | Bruner .......................... 235/103.5 R |
| 3,725,889 | 4/1973 | Glosek ............................... 340/268 |
| 3,794,814 | 2/1974 | Lay et al. ........................ 235/92 EV |
| 3,910,107 | 10/1975 | Fabry ..................... 340/271 |
| 3,982,107 | 9/1976 | Butler ............................. 235/92 EV |

OTHER PUBLICATIONS

Ross E. Hupp, "Bidirectional Counting,"*Instruments & Control Systems*, pp. 2596-2597, Dec. 1960.

Primary Examiner—Joseph M. Thesz
Attorney, Agent, or Firm—Browdy and Neimark

[57] ABSTRACT

A circuit arrangement for protecting an overload coupling includes respective pulse generating elements which produce respective pulse trains, the difference between individual repetition rates of which is a measure of slip. A pulse comparator, in the form of a resettable forward-backward counter receives outputs from the two pulse generating elements and is provided with a reset input. A decoding stage is connected to receive the counting result output from the counter. A warning signal generator receives the output of the decoding stage. A disconnecting device is operatively arranged to disengage the coupling upon production of a signal from the decoding stage indicating a given slip.

11 Claims, 1 Drawing Figure

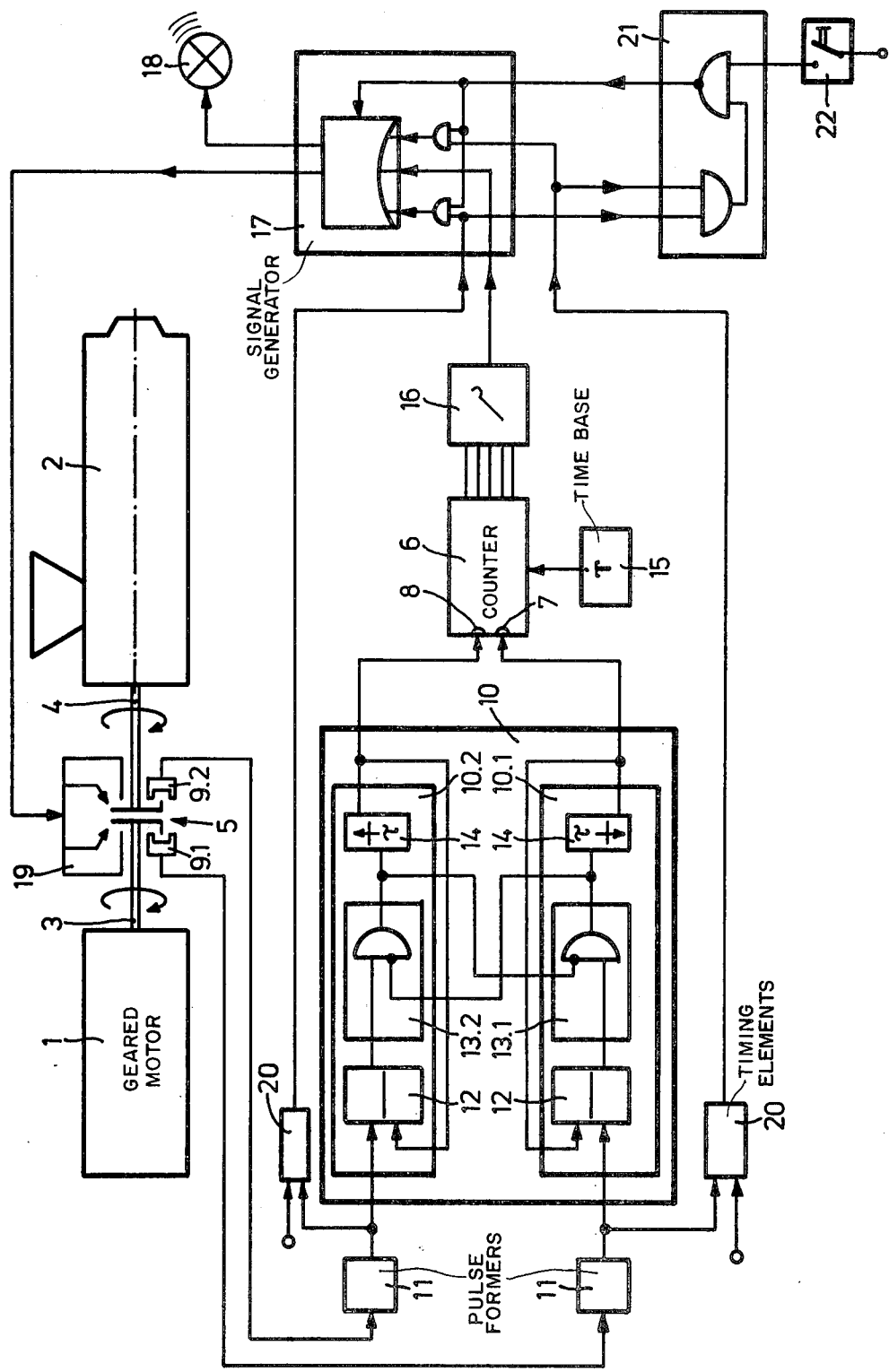

CIRCUIT ARRANGEMENT FOR PROTECTIVE COUPLINGS

FIELD OF THE INVENTION

This invention relates to a circuit arrangement for protecting couplings which involves monitoring the slip of an overload coupling or clutch between a driving machine element and a driven, rotating machine element. The invention is concerned more particularly with such a circuit arrangement utilizing a contactless rotational speed pulse generator element on each part of the clutch and a pulse comparator connected downstream thereof.

BACKGROUND OF THE INVENTION

In operation, overload couplings or clutches of the kind considered here tend to slip when overloaded, that is to slip when the torque is increased to an impermissible great extent. Overload clutches of this kind are provided for the protection of machines or machine parts particularly when a powerful driving unit must work against considerable counterforces; if locking occurs in the working machine as the result of a breakdown, either the working machine may be destroyed through overload or the driving unit may be damaged by running at high speed without load. This problem occurs particularly in screw machines such as extruder machines, in which the circuit arrangement of the invention finds its preferred application.

Although commercial slip indicators exist, which in principle are also suitable for the task of monitoring overload clutches, it has nevertheless been found that these known devices either react to a deviation from zero slip or else respond only at comparatively high slip values. Both of these response limits are unsuitable for the preferred application of the invention. It has in fact been found that overload clutches suitable for extruder machines have a continuous slight operating slip which leads to a kind of self-cleaning effect to which the accurate and reliable response of the overload clutch when subjected to overload is attributable. If they were adjusted to zero slip the available devices would therefore continuously bring about overload release even during operation under normal conditions, although there would actually be no justification for this, whereas on the other hand the adjustable value of slip other than zero is already so great that because of the powerful driving forces the heat generated in the overload clutch would lead to destruction of the clutch.

It has already been attempted to produce slip monitoring circuits which work with greater sensitivity, these being based on the counting of pulse transmissions from each of the two parts of the clutch; when there is no slip, each pulse transmission from the driving part of the clutch is followed by a pulse tramsmission from the driven part of the clutch which neutralizes this first pulse transmission. When slip occurs, the second, compensating pulse is increasingly retarded until finally another pulse from the driving part of the clutch arrives before the arrival of the compensating pulse, so that the compensating part of the clutch, which acts after the driving part, will compensate only one of the two first pulses. These pulse transmissions are converted into a voltage level, and a subsequent voltage level or voltage difference evaluation initiates the monitoring or check signal for indicating impermissibly high slip. It has however been found that even with slip monitoring circuits of this kind the required sensitivity of response, which has to be asked of the circuit arrangement because of the comparatively low operating slip extending up to about 0.12%, cannot be achieved. One important reason for this is that, because of manufacturing and functional tolerances of these circuit arrangements based on voltage difference measurement, the necessary accuracies cannot be permently maintained when operating with extremely low permissible slip.

SUMMARY OF THE INVENTION

It is another object of the present invention to provide a circuit arrangement for protecting a coupling which effects a decoupling only when slip exceeds zero slip by a predetermined value.

It is another object of the present invention to provide a circuit arrangement for protecting a coupling which effects a decoupling upon the occurrence of slip less than that which would damage the coupling or deiven machine element and yet exceeds zero by a given value.

According to the present invention, there is provided a circuit arrangement for protecting an overload coupling between a driving machine element and a driven, rotating machine element, comprising means for monitoring the slip of the coupling, including a respective contactless rotational speed pulse generator element associated with two parts of a clutch. A pulse comparator is provided to which the output of each pulse generator is connected. The pulse comparator is a forward-backward counter to whose forward and backward counting inputs is supplied respectively, the outputs from the pulse generators, and to whose reset input a time base stage is connected. The counting result output of the counter is fed to a decoding stage which responds to a predetermined minimum counting result and which operates a signal generator.

For the economical construction of a circuit arrangement of this kind it is desirable to be able to use forward-backward counters of a simple type, that is to say inexpensive devices. The simple counters however have the disadvantage that between operation in the forward counting direction and operation in the backward counting direction a certain switching time must always elapse, and it is precisely with low slip that the signals are transmitted by the two parts of the clutch in extremely close succession. Furthermore, in the case of greater slip or when the two parts of the clutch accidentally assume a certain position in relation to one another it may even happen that the two pulse transmissions overlap. In order nevertheless to ensure reliable operation of a counter which can be operated forwards or backwards only at certain intervals of time, in a further feature of the invention a two-channel decoupling circuit is provided. This circuit ensures that only the first pulse initiated by a clutch part which occurs first will set directly on the counter for forward or backward counting, but that the following pulse is not lost but in turn acts on the counter after the first pulse has had its effect.

According to a further feature of the invention, additionally to the measures mentioned above and which will be described in detail below, at least one timing element bridging the two-channel decoupling circuit and the counter is provided, this timing element preventing the machine protected by the overload clutch from being put into operation if by mistake the circuit connection of the invention has not been connected to the overload clutch. This timing element may also serve as a rotational speed monitor ensuring that after disconnection of the overload clutch as the result of impermissibly increased slip, the driving part of the machine is recoupled to the driven part only when the relative rotational speed between these two parts of the machine has become sufficiently low.

BRIEF DESCRIPTION OF THE DRAWING

The single FIGURE of drawing is a schematic illustration of an overload clutch, which can be considered a slip coupling, between two shaft ends, serving, respectively, as driving and driven machine elements, together with a preferred example of a circuit arrangement according to the present invention, shown as a clock diagram.

DETAILED DESCRIPTION OF THE PREFERRED EMBODIMENT

As shown in the drawing figure, a geared motor 1 drives a rotationally driven working machine in which the rotary drive is opposed by considerable counterforces, for example the screw press of an extruder machine 2. In order to protect the geared motor 1, but in particular to protect the extruder machine 2, force is transmitted between the driving shaft end 3 and the driven or output shaft end 4 by way of an overload clutch 5. Overload clutches of this kind are usually in the form of slipping clutches, that is to say when the torque acting on the clutch surface becomes excessive because of the blocking of the extruder machine 2, the overload clutch 5 will slip in order to protect the extruder machine 2 from damage. This slipping of the overload clutch 5 also provides the advantage that the geared motor 1 cannot be braked to a standstill by the overload - a method of operation which would also entail the danger of damage to the geared motor 1.

Commercially available overload clutches of the kind considered here usually have in normal operation a certain slip which serves in particular for the self-cleaning of the opposing clutch surfaces. In overload clutches, of the type particularly useful, the clutches 5, which have been produced in practice this operating slip may amount to up to about 0.12%. If in consequence of the blocking of the extruder machine 2 the overload clutch 5 should slip completely because its driven clutch part, which is rigidly joined to the driven shaft end 4, is stationary, while the clutch part is rigidly joined to the driving shaft end 3 continues to be turned by the geared motor 1, the entire driving energy in the frictional surface between the two parts of the clutch must be absorbed. In consequence of the considerable generation of heat between the two parts of the clutch, this operating state, in which the overload clutch 5 has thus responded, usually leads rapidly to the destruction of the overload clutch 5. this entails the disadvantage that not only must the extruder machine 2 now be cleared out before being put back into operation, but that in particular a new overload clutch 5 has to be installed between the shaft ends 3 and 4.

The circuit arrangement according to the invention for protecting the overload clutch 5 serves to prevent the destruction of the responding overload clutch 5 by continuous monitoring of the slip of the overload clutch 5.

The instantaneous slip is measured in a digital counter 6 adapted to be selectively operated forward or backwards. Each of the two counting inputs to the counter 6 is operated by an associated part of the overload clutch 5, and in the illustrated embodiments the forward counting input 7 is operated by the clutch part connected to the driving shaft end 3, and the backward counting input 8 is correspondingly operated by the clutch part connected to the driven shaft end 4. Each of the two clutch parts is equipped with a preferably contactless rotational speed pulse transmitter element 9.1 and 9.2 respectively. In a manner known per se, this may involve optical, ferromagnetic, or other sensing of the rotation of the clutch parts. The drawing shows an embodiment utilizing respective metal lugs which are fastened to a clutch part and which on passing through the associated pulse transmitter element 9.1 or 9.2 respectively, initiates the transmission of a pulse. Particularly in the case of a low rotational speed of the shaft ends 3 and 4, it may be expedient to generate by suitable means a plurality of pulses for each rotation of a clutch part, for example, by providing a plurality of angularly offset metal lugs on the clutch parts. Multiple pulse transmission for each revolution in this manner increases the accuracy of measurement. In the interest of simpler evaluation of signals it is expediently ensured by corresponding reciprocal arrangements that the two clutch parts produce an equal number of pulses for a revolution, with the same relative time displacement.

A problem is that simple forward-backward counters, such as the counter 6, can process at the same time only either a control pulse acting in the counting direction or a control pulse acting oppositely to the counting direction and that for the change-over a dead time, specific to the circuit, must elapse between two successive operations of the two counting inputs 7,8. When a counter 6 of this kind is used for the present purposes this circumstance would lead to complications, particularly when an impulse is transmitted by each of two pulse transmitter elements 9.1 and 9.2 simultaneously or in very rapid succession. This may for example occur in the case of very slight slip or of accidental coincidence, due to the spatial arrangement of the pulse transmitter 9.1, 9.2, of the points on the periphery of the clutch parts which determine the timing of the impulse transmissions.

In order to eliminate such complications despite the use of a simple counter 6 and in accordance with the invention, a two-channel decoupling circuit 10 is connected between the pulse transmitter and the counting inputs 7, 8 of the counter 6. This circuit ensures that even if the pulse transmissions overlap or closely follow one another from the pulse transmitter elements 9.1, 9.2, the counter 6 will be correctly operated without these signal pulses being lost for monitoring the slip. In the interest of undisturbed signal processing it is expedient for pulse formers 11 to be interposed between each of the two channels 10.1, 10.2 of the decoupling circuit 10 and the pulse generator elements 9.1 and 9.2 respectively in order to make available devined pulses on the operation of the pulse generator elements 9.1 and 9.2 respectively.

The output signal of the operated pulse former 11 is taken over in an erasable store 12 in the appertaining channel 10.1 or 10.2, this store being shown in the embodiment illustrated in the drawing as a bistable trigger stage. In each channel 10.1, 10.2, an interlock stage 13.1 and 13.2 respectively, is connected downstream of the store 12, this stage having the effect that when one of the two channels 10.1 or 10.2 is operated by the setting of the corresponding store 12, the corresponding interlock stage 13.2 or 13.1 in the other channel (10.2 or 10.1) is switched over to blocking. In order to explain this function, in the illustrated embodiment each interlock stage 13.1, 13.2 is provided as an AND gate having one direct input and one inverting input, the inverting input being connected in each case to the output of the interlock stage 13.2 or 13.1 of the other channel 10.2 to 10.1. A delay element 14 is connected downstream of each interlock stage 13.1, 13.2, and is shown in the drawing as a monostable trigger stage; this delay element 14 allows an input pulse to appear at its output, which in the example of the circuit illustrated is identical with the corresponding channel output, only after an adjusted time lag. One channel 10.1 is connected to the forward counting input 7, and the other channel 10.2 is connected to the backward counting input 8 of the counter.

When the pulse generator elements 9.1 and/or 9.2 transmit a pulse (simultaneously or in succession), the store 12 connected downstream in the associated channel 10.1 or 10.2 is set by way of the appertaining pulse shaper 11. The delay element 14 is, however, operated only in that channel 10.1 or 10.2 whose store 12 was set before the store 12 of the other channel 10.2 or 10.1, because when an output signal is present at one of the stores 12, the other channel 10.2 or 10.1 is immediately blocked by means of the interlock stage 13.1 or 13.2. On operation of the appertaining counting input 7 or 8, the appertaining store 12 is reset as the result of the feedback from the output of the channel 10.1 or 10.2. The interlocking in the other channel 10.2 or 10.1 is thus cancelled and the output signal of the other store 12 is switched through to the associated delay element 14 qhich on expiry of its time lag operates the other counting input 8 or 7 of the counter 6.

Consequently, the two-channel decoupling circuit 10 ensures that both the counting inputs 7 and 8 of the counter 6 cannot be operated simultaneously, even in the event of simultaneous or overlapping pulse transmission by the pulse generator elements 9.1 and 9.2. The delay elements 14 ensure that after the resetting of a store 12 and consequently the release of the interlock stage 13.1 or 13.2 in the neighboring channel 10.1 or 10.2 — which now leads to the operation of the delay element 14 when the store 12 in question is set — the other counting input 7 or 8 of the counter 6 will be operated only at the end of the time lag. The time lags of the delay elements 14 are thus to be adjusted at least to the minimum retardation time, specific to the counter, between the change-over from one counter input 7 or 8 to the other. It is true that retarded operation of the counter 6 is thus generally effected, but because of the short time lags used in practice it has been found that this does not lead to complications in the monitoring of slip for the protection of the overload clutch 5. In order to prevent reciprocal blocking in the event of exactly simultaneous operation of the two channels 10.1, 10.2, it is expedient for the delay elements 14 to be adjusted to slightly different time periods.

As already explained, an overload clutch 5 of the kind dealt with here has a certain minimum slip even during normal operation. This means that — after a certain period of operation — between two operations of the backward counting input initiated by the driven clutch element there will be not one but two operations of the forward counting input 7 of the counter 6. In other words, over a long period of operation the slight operating slip has the effect that not every forward counting of the driving clutch part will be compensated by a successive backward counting initiated by the driven clutch part. This is to say that in the course of the operating period the counter 6 will not always only count to-and-fro between the counting results "zero" and "one," but will also count beyond "one." The speed of this slow forward counting can be determined through the operating slip specific to the clutch. In this way a period of time can be predetermined within which, if only the operating slip exists, a determined counting result cannot be exceeded. In order to predetermine this period of time, a time base stage 15 is connected to the counter 6 and on expiry of this period of time resets the counter 6 to the initial counting position "zero."

If, however, before expiry of this period of time defined by the time base stage 15 the critical counting result just defined should be reached, this is proof that the slip of the overload clutch 5 has increased in relation to the operating slip, because in consequence of a correspondingly increased rotational speed of the driving part of the clutch in relation to the driven part of the clutch the backward-counting pulse are increasingly delayed in relation to the forward-counting pulses.

This critical situation is dealt with by connecting downstream of the counter 6 a decoding stage 16 which is adjusted to a predetermined counting result which can just not be achieved within the period of time predetermined by the time base stage 15 if only operating slip occurs in the overload clutch 5. This decoding stage may, for example, be an adjustable or wired-in counting interrogation system, with dual or decimal decoding depending on the type of counter 6.

When the decoding stage 16 responds because the slip in the overload clutch 5 has increased in relation to the operating slip, a signal generator 17 connected to its output is operated and operates a warning signal device 18, which acts, for example, optically or acoustically. In particular, however, it is expedient for a clutch disconnection device 19 also to be connected to the output of the signal generator 17, thus ensuring that the overload clutch 5 is disengaged immediately on the exceeding of the permissible operating slip, that is to say is protected against destruction resulting from the generation of heat.

With the circuit arrangement described so far, reliable protection of the overload clutch 5 when the slip increases beyond the operating slip is ensured. In order, however, also to protect the overload clutch 5 when for any reason, for example through accidental failure to connect the pulse generator elements 9.1, 9.2, the two-channel decoupling circuit and consequently also the counter 6 are not operated at all, a timing element 20 is connected in parallel to the input of each channel 10.1, 10.2, the outputs of this timing element being connected to the signal generator 17 by way of an OR gate, in parallel to the output of the decoding stage 16. When the circuit arrangement is put into operation, each of these timing elements 20 is set, and if no pulse arrives from the appertaining pulse generator elements 9.1 or 9.2 before expiry of the adjusted period of time the respective timing element 20 will drop back and transmit an output signal to the signal generator 17, in order to disconnect the two parts of the overload clutch 5 from one another as a precaution, since otherwise the overload clutch 5 would not be monitored by the circuit arrangement described. If no pulses arrive from the pulse generator elements 9.1 or 9.2, the appertaining timing element 20 thus runs down and by means of the signal generator 17 disengages the overload clutch 5. The closing of a contactor 22 resets the signal generator 17, but does so only when both the timing elements 20 have run down. With the reset signal of a reset circuit 21 the signals produced by the timing elements 20 are blocked in order to enable the signal generator to be reset. When the driven machine 2 starts up again, the output signals of the timing elements 20 disappear after the first respective pulse from the pulse generator elements 9.1 and 9.2, and when the contactor 22 is opened again the overload clutch 5 is once more monitored.

In order also to be able to start the machine 2 extremely slowly despite the safety system consisting of the timing elements 20, it may be expedient not to change the characteristic times of the timing elements 20, but to provide the signal generator 17 with bistable switching behavior, the reset circuit 21 being connected to its reset input. If the signal transmission to this reset input is predominant in relation to a signal transmission to the previously mentioned setting input (operated by the timing elements 20 or by the decoding stage 16), the action of the signal generator 17 can be blocked by means of the contactor 22 during intentionally slow starting.

After disconnection of the overload clutch 5 through the action of the signal generator 17 when excessive slip occurs, the driven part of the clutch, which is connected to the blocked extruder machine 2, will be very abruptly brought to rest. The driving shaft end 3 connected to the geared motor 1 will on the other hand continue to rotate without load, unless special braking means are provided. In order to prevent reengagement of the overload clutch 5 at a moment when the driving part of the clutch together withits shaft end 3 is still rotating at high speed, it may be expedient for a rotational speed monitor to be connected downstream of, at least, the pulse generator element 9.1 associated therewith, this monitor resetting the signal generator 17 — still with bistable switching behavior — only whtn the instantaneous rotational speeds of the two shaft ends 3 and 4 coincide to within permitted limits. Acording to a convenient further development of the invention, the function of a rotational speed monitor of this kind is likewise served by the timing elements 20, for which reason their outputs in the reset circuit 21 are combined through logic components with the operation of the contactor 22.

Since the critical rotational speed of the driving clutch part must in fact in practice be very low for reengagement of the overload clutch 5, it is sufficient for the timing elements 20 to be constructed, for example, as retriggerable monostable trigger stages, which produce a signal when the pulse transmission from the pulse generator elements 9.1 or 9.2 connected upstream in the circuit is not repeated at least once within the switch-back time of these trigger stages. If therefore one of these timing elements 20 in the form of monostable trigger stages switches back, this means adequate lowering of the rotational speed of the appertaining part of the clutch, and only then will the signal generator 7 be cleared by means of the contactor 22 and the reset circuit 21 and the operation of the coupling disengagement device 19 be terminated.

What is claimed is:

1. A circuit arrangement for protecting an overload coupling having a first driving part and a second driven part between a driving machine element and a driven, rotating machine element, the circuit arrangement comprising a forward-backward counter followed by a decoding stage and being coupled to a two-channel decoupling circuit which is connected to respective rotational speed, pulse generator elements which are coupled respectively to said driving part and said driven part and are responsive to rotation thereof said forward-backward counter having a reset input; a time base stage having its output connected to said reset input; a counting result output of said counter being coupled to said decoding stage which responds to a predetermined minimum counting result; and a signal generator coupled to said decoding stage and responsive to its output.

2. A circuit arrangement according to claim 1 wherein each channel is provided with a store at the input and a delay element at the output of the channel and an interlock stage is provided between the store and the delay element which on operation by the store in one channel blocks the interlock stage in the other channel of the decoupling circuit.

3. A circuit arrangement according to claim 2, wherein each store has bistable switching behavior and its set input is connected to the appertaining pulse generator element and its cancel input is connected to the output of one channel of the decoupling circuit.

4. A circuit arrangement according to claim 2, wherein each delay element is adjusted to a delay period which corresponds to the minimum blocking time for transition between forward and backward operation of the counter in either direction 5. A circuit arrangement according to claim 4, wherein the two delay periods are differently adjusted.

6. A circuit arrangement according to claim 1, wherein the signal generator operates a warning signal device.

7. A circuit arrangement according to claim 1, wherein the signal generator operates a clutch disengagement device.

8. A circuit arrangement according to claim 1, wherein a timing element, the outputs of which operate the signal generator, is connected to the output of each pulse generator element.

9. A circuit arrangement according to claim 1, wherein the signal generator has bistable switching behavior and its reset input is connected to a reset circuit.

10. A circuit arrangement according to claim 9, wherein the reset circuit is provided with a contactor and in addition is connected to rotational speed monitors connected downstream of the pulse generator elements.

11. A circuit arrangement according to claim 10, characterized in that a timing element, the outputs of which operate the signal generator, comprise the rotational speed monitors which have the switching behavior of retriggerable monostable trigger stages, the timing generator being connected to the output of each pulse generator element.

* * * * *